May 15, 1951 — R. A. FONTAINE — 2,552,627
SHIFTABLE DUMP BODY FOR TRUCKS
Filed April 9, 1947 — 3 Sheets-Sheet 1
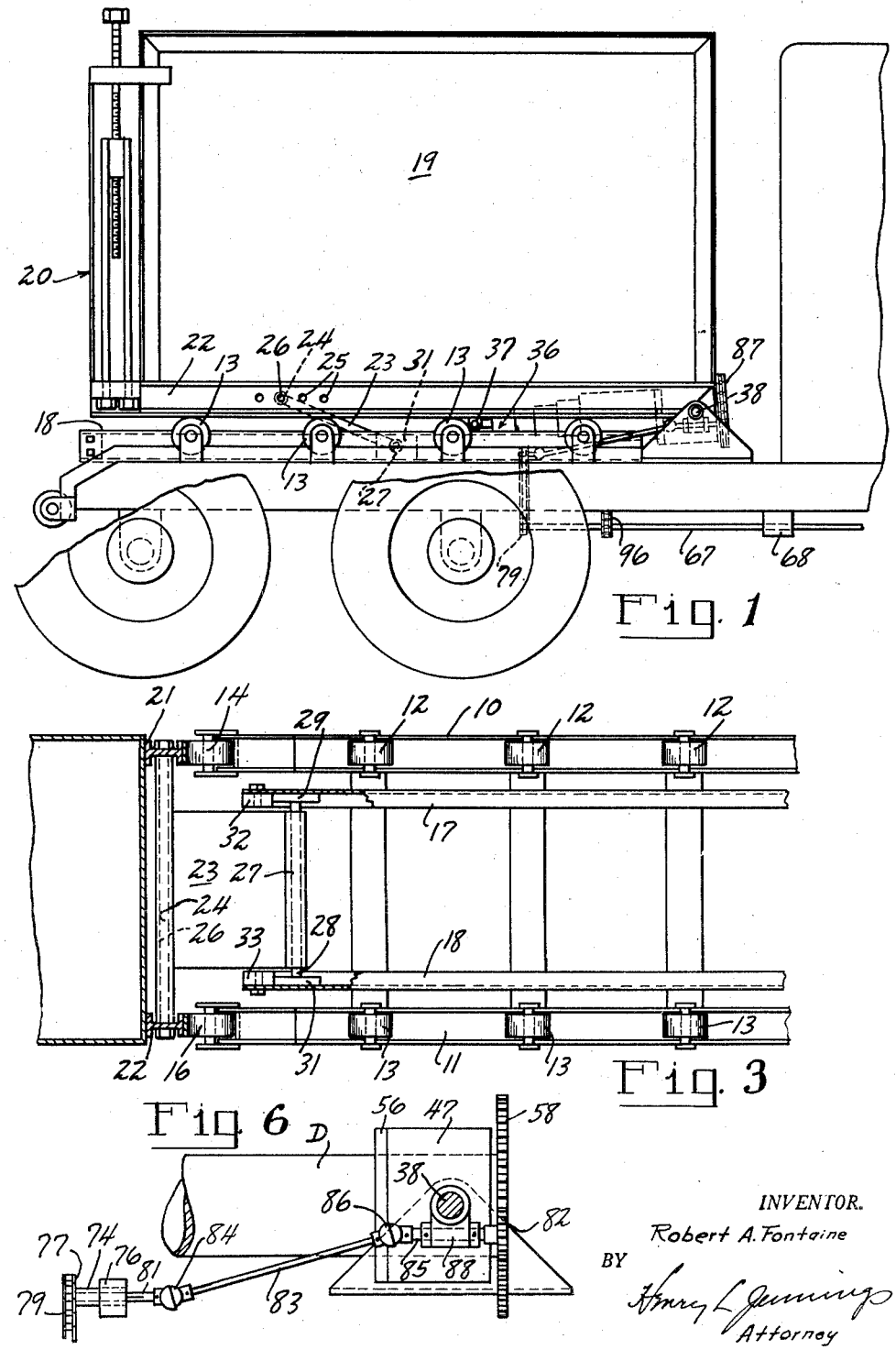
INVENTOR.
Robert A. Fontaine
BY Henry L. Jennings
Attorney

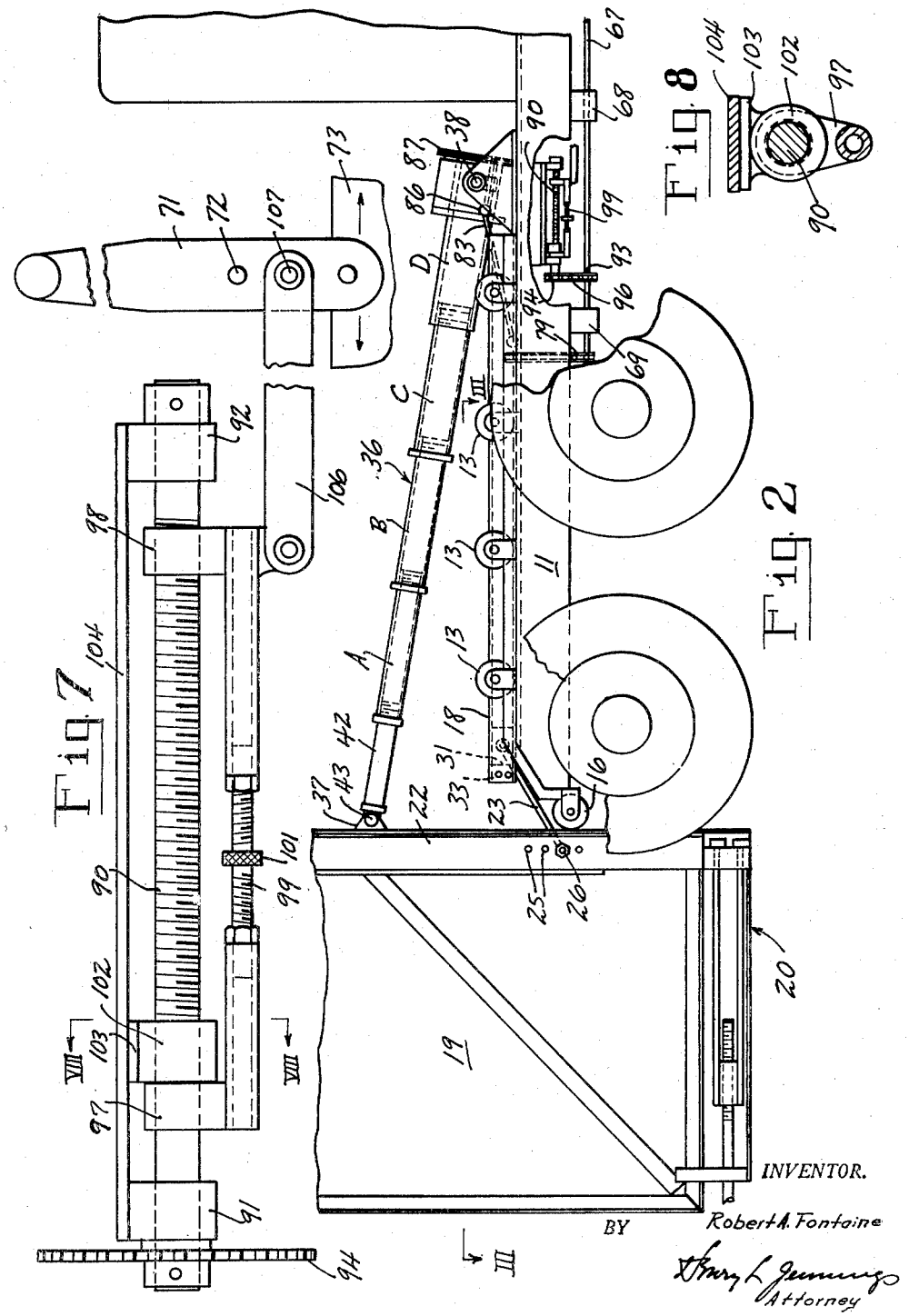

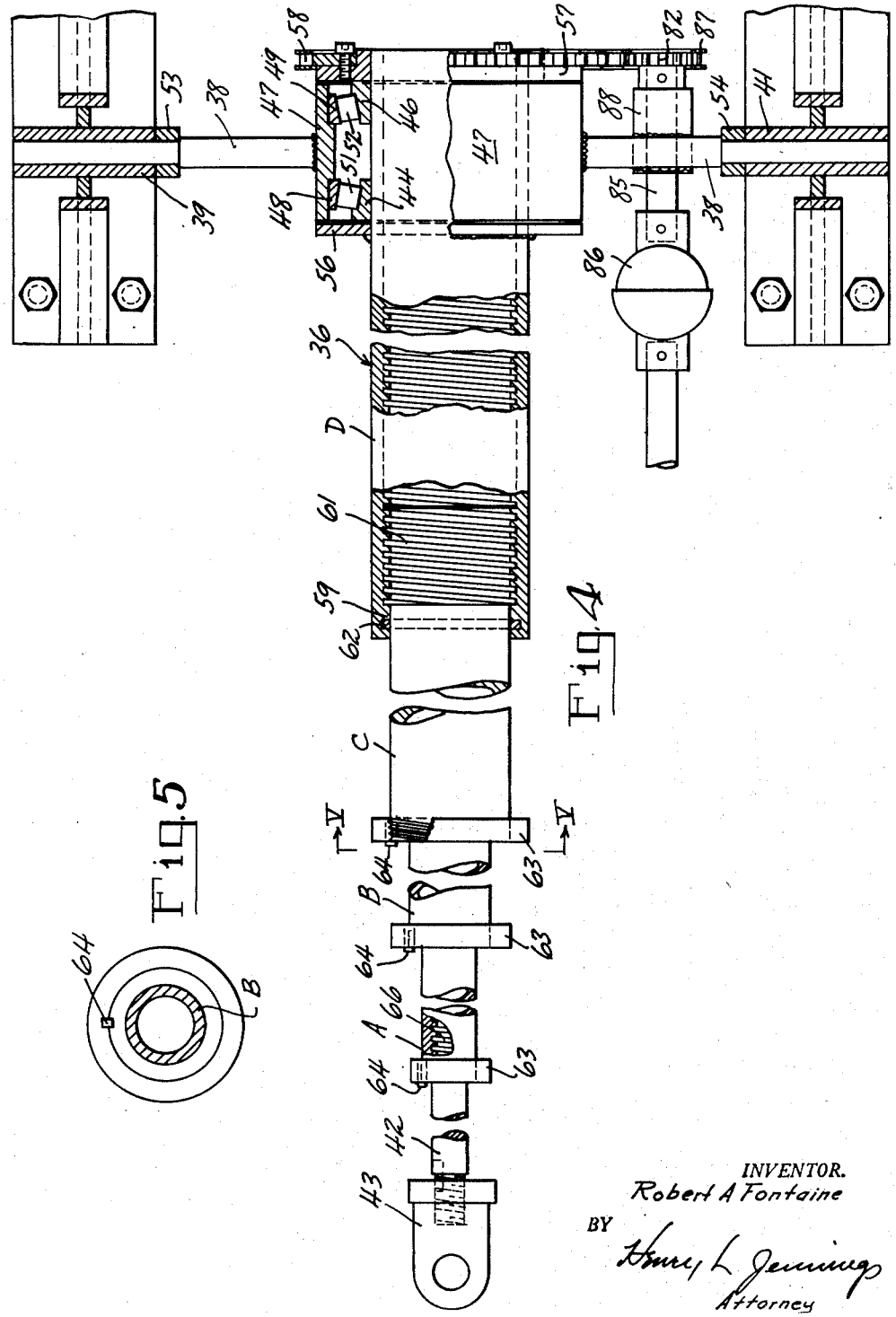

Patented May 15, 1951

2,552,627

UNITED STATES PATENT OFFICE 2,552,627

SHIFTABLE DUMP BODY FOR TRUCKS

Robert A. Fontaine, Birmingham, Ala.

Application April 9, 1947, Serial No. 740,441

8 Claims. (Cl. 298—16)

This invention relates to a shiftable dump body for trucks and has for an object the provision of such a body, mounted for horizontal movement and a turning, or dumping movement, together with means to shift the body and turn it through an angle of 90° to discharge the contents thereof and to return it to its original position.

A further object of my invention is to provide operating mechanism for a shiftable dump body of the character designated including a double acting telescoping screw jack effective to move the body from one extreme position to the other and to restrain the body against shocks during such movement.

A still further object of my invention is to provide, in a shiftable dump body, a double-acting jack, operable from the power take off of a truck, and including means for disengaging the power take off at predetermined limits.

As is well known in the art to which my invention relates, it is very desirable in hauling and handling various materials in trucks, that they be unloaded by turning the truck body through an angle of approximately 90°. Shiftable dump bodies are well known for accomplishing this purpose. As heretofore constructed, these bodies, in turning, were largely unrestrained so that materials were unloaded therefrom with such shock that damage would result to the truck and to certain materials such as brick or concrete building blocks. It is accordingly, one of the principal objects of my invention to provide a shiftable dump body and mechanism for operating the same which shall be effective to maintain rigid control of the entire shifting and dumping movement of the body.

This result is obtained by providing a longitudinally shiftable hinge connection between the rear portion of the dump body and the truck frame and by a double acting jack screw pivotally connected to the forward portion of the dump body and the truck frame. By means of the jack, the body may be moved horizontally from its hauling, or starting, position until the center of gravity of the body passes beyond its line of support, whereupon the body begins to turn about the end of the support but is restrained from abrupt movement by reason of the action of the screw jack. This jack is operated to allow the dumping movement of the body to proceed at controlled rate, whereupon there is no damage to material being handled or to the dump body. Included in the hinge and pivotal connections are means to retain the body against lateral movement with respect to the truck frame.

A dump body embodying features of my invention is illustrated in the accompanying drawings, forming a part of this application in which:

Fig. 1 is a side elevational view with the body in hauling position;

Fig. 2 is a side elevational view with parts broken away and showing the body in dump position;

Fig. 3 is a sectional view taken along the line III—III of Fig. 2;

Fig. 4 is a detail sectional view of the telescoping screw jack and the mounting and drive therefor;

Fig. 5 is a sectional view taken along the line V—V of Fig. 4;

Fig. 6 is a fragmentary sectional view showing the drive for the telescoping screw;

Fig. 7 is an enlarged side elevational view of the limit mechanism for the screw jack; and Fig. 8 is a detail sectional view taken along the line VIII—VIII of Fig. 7.

Referring now to the drawings for a better understanding of my invention, I show in Figs. 1, 2, and 3, a fragment of a truck having a frame including lateral longitudinal frame members 10 and 11 each having mounted thereon a set of horizontally disposed rollers 12 on one side, and a similar set 13 on the opposite side. At the ends of the frame members 10 and 11 are rollers 14 and 16, disposed at a lower level than the rollers 12 and 13 which are positioned to receive the dump body when in dump position, as will later be shown. Also included in the truck frame are inner, longitudinally extending, channels 17 and 18 with the webs thereof facing inwardly, as shown in Fig. 3.

The dump body, shown at 19, is mounted on longitudinally extending I beams 21 and 22 which are adapted to rest on the rollers 12 and 13 when the body is in the carrying position shown in Fig. 1 of the drawing and which bear against the rollers 14 and 16 when the body is in the dump position shown in Figs. 2 and 3 of the drawing. The body 19 is provided with a suitable end closure 20 which may be similar to the brick stack grab described in my prior Patent No. 2,213,629, dated September 2, 1940. Such a mechanism is desirable in providing a ready release for material being handled after the body has reached dump position. The body is connected to the truck frame by means of a hinge plate 23 which has joined to one end thereof a barrel or tube 24 fitting snugly between the I beams 21 and 22 and through which a hinge bolt 26 extends. The other end of the hinge plate 23 has connected thereto a tube, or barrel 27, extending between the channels 17 and 18 of the truck frame. A hinge pin 28 extends through the tube 27 and is connected at its ends to blocks 29 and 31 which are slidable in the channels 17 and 18, respectively. At the ends of the channels 17 and 18 are stop blocks 32 and 33 which are disposed to engage the sliding blocks 29 and 31 at the rearward limits of their travel. It will be noticed from Fig. 1 of the drawing, that the rearward end of the hinge plate 23 is connected to the dump body 19 rearwardly of the midpoint between the ends of the body. This permits the body to begin tipping, when shifted rearwardly on the truck frame, as soon as the center of gravity passes rearwardly of the rollers 12 and 13. The I beams 21 and 22 are each provided with a plurality of holes 25 for receiving the hinge pin 26 whereby the initial position of the dump body 19 may be varied longitudinally of the truck frame.

Connected to the dump body 19, forwardly of the midpoint between the ends thereof, as shown in Fig. 1, and midway between the sides, is a screw jack 36. As shown in Fig. 2 of the drawing, the rearward end of the jack 36 is pivotally connected to the dump body at 37, and at its forward end the jack is pivotally connected to the truck frame by means of a cross shaft 38 mounted in bearings 39 and 41 carried by the truck frame members 10 and 11.

As best seen in Fig. 4, the jack 36 is comprised of four cylindrical, telescoping sections, A, B, C, and D, and a head, or rod 42, which is connected at its outer end to a clevis 43 forming a part of the pivot connection 37 to the dump body 19. The cylindrical sections A and C are preferably made of brass while the cooperating sections B and D and the rod 42 are preferably made of steel. Mounted on the rearward end, or base of the section D are two bearing races 44 and 46 which have their surfaces inclined in opposite directions to form thrust bearings for the jack when operating in either direction. Surrounding the base of the section D is a sleeve 47 carrying the cooperating outer bearing races 48 and 49, and to which the cross shaft 38 is joined. Bearing elements 51 and 52 are interposed between the races as shown in Fig. 4 of the drawing.

The cross shaft 38 is restrained against lateral movement by means of collars 53 and 54 which bear against the bearings 39 and 41. Mounted on the base section D of the jack are annular cover plates 56 and 57 to protect the antifriction bearings. Mounted on the lower or base plate 57 is a sprocket 58 by means of which the cylindrical section B is rotated.

Each of the cylindrical sections A, B, C, and D is internally threaded throughout its length except near the outer end thereof where it is reduced in diameter as shown particularly at 59 in Fig. 4 of the drawing. The sections A, B, and C are each provided with an enlarged end portion having external threads 61, as shown in Fig. 4, which cooperates with the internal threads of its associated section. The reduced diameter portion of each of the cylindrical sections extends out through the reduced diameter portion 59 of its associated section and a suitable packing 62 is provided in the reduced diameter portion 59 to prevent the ingress of dirt and grit into the cylindrical section.

Mounted on each of the sections A, B, and C, around the outer end thereof, is a ring 63, which may be screwed on as shown in Fig. 4 of the drawing and held in place by means of a key 64. This ring is adapted to bottom against the outer end of the associated jack section to prevent overtravel of the sections with respect to each other. Also, the enlarged threaded end of each of the sections A, B, and C, is adapted to bottom against the reduced diameter section 59, as the sections move outwardly relative to each other, thereby preventing relative overtravel of the sections when moving outwardly. The rod, or head 42, is externally threaded at its inner end as shown at 66 to cooperate with the internally threaded outer end of the cylindrical section A.

At 67, in Fig. 2 of the drawing, I show the usual power take off shaft of the truck which is journaled in brackets 68 and 69 on the truck frame. As is well understood, the shaft 67 may be driven in either direction, selectively, and for this purpose I have shown a conventional shifting lever 71 pivoted at 72 to move a shifting element 73 connected to the lower end thereof, as indicated, it being understood that when moved to the extreme of its travel in one direction, the shaft 67 will rotate in one direction and when the lever 71 is moved to the extreme of its travel in the opposite direction, the direction of rotation of the shaft 67 will be reversed. When the shifting element 73 is in mid position, there is no movement of the power take off shaft 67. The shaft 67 drives a hollow countershaft 74 mounted in a bearing 76 carried by the truck frame, by means of sprockets 77 and 78 and a sprocket chain 79.

Splined to the hollow shaft 74 is a shaft 81 which drives a sprocket 82 mounted on a stub shaft 85 through a connecting shaft 83 and universal couplings 84 and 86. The sprocket 82 drives the sprocket 58 by means of a chain 87. A bearing 88 for the shaft 85 is carried by the cross shaft 38.

In order to prevent damage to the jack due to the application of power after the jack sections have reached the limits of their travel, I provide the limit mechanism shown in Fig. 7 of the drawing. This mechanism comprises a screw shaft 90 having its ends mounted in bearings 91 and 92 carried by the truck frame as shown in Fig. 2 of the drawing. The screw shaft 90 is driven from the power take off shaft 67 by means of sprockets 93 and 94 and a sprocket chain 96. It is thus caused to rotate in the same direction as the power take off shaft 67. Slidably mounted upon the screw shaft 90 is a limit bracket having spaced apart ends 97 and 98, the said ends being relatively near the ends of the shaft and to the bearings 91 and 92 to afford only limited movement for the bracket. The ends 97 and 98 are connected together by means of a screw 99 having its ends oppositely threaded and having an adjusted knurled portion 101 thereon to vary the distance between the heads 97 and 98. Mounted on the screw shaft 90, between the heads 97 and 98 is a limit nut 102 having a flat upper portion 103 which bears against a plate 104, carried by the truck frame, to prevent rotation of the nut on the threaded shaft 90. By this means, the nut is caused to travel from end to end of the threaded shaft upon rotation of the shaft. The lower end of the head 98 is connected by means of a link 106 to the shifting lever 71, at 107. It will be seen that when the threaded shaft 90 is rotating in either direction, it may rotate until the nut 102 engages the head 97 or 98 of the bracket, as the case may be, whereupon the shifting lever 71 and shifting element 73 is pulled to mid position, stopping rotation of the power take off shaft 67. The shaft can then rotate only in the opposite direction.

The operation of my improved dump truck body is as follows. When the body is in its carrying position, as shown in Fig. 1 of the drawing, the jack 36 is completely retracted and lying down in a substantially horizontal position. The body 19 has its I beams 21 and 22 resting on the rollers 12 and 13 and is restrained against lateral movement by means of the hinge plate 23 and the hinge connections 24 and 27. It is held against longitudinal movement by the screw jack 36. Also, in this position the body is restrained by the jack 36 and hinge plate 23 against vertical movement relative to the frame. The screw jack is held against lateral movement by the collars 53 and 54 on the shaft 38. When it is desired to move the body 19 to dump position, the power take off shaft 67 is rotated in the appropriate direction to effect outward movement of the jack sections. Inasmuch as the jack is lying substantially horizontal, the body 19 is first moved rearwardly in a horizontal direction, the guide blocks 29 and 31 sliding in the channels 17 and 18. As soon as the guide blocks 29 and 31 reach the stop blocks 32 and 33, the center of gravity of the body 19 will have passed beyond the end of the truck frame and it will begin to tip over endwise. It will be restrained against sudden abrupt, tipping movement by reason of the telescoping screw sections of the jack and the double thrust bearings on the base of the cylindrical section D. As the jack 36 continues to elongate, the rear end of the body 19 is gradually eased down to the dump position shown in Fig. 2 of the drawing. The load may then be released, the truck moved forward out of the way of the load, and the body moved to its original carrying position by a reverse movement of the jack.

It will thus be seen that I have provided a shiftable dump truck body with means for operating the same which is simple of design and operation, easily manipulated, and one by means of which a load may be handled without abrupt shock and breakage.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus of the character described, a truck frame, a body shiftable longitudinally on the frame and adapted to turn through an angle of 90° about the end of the frame, a hinge plate pivotally connected to the dump body toward the rear of the frame and extending forwardly therefrom, a longitudinally slidable connection between the other end of the hinge plate and the truck frame, said connections being disposed to restrain the body against lateral movement on the truck frame, and a double acting jack pivotally connected to the truck frame and to the dump body forwardly of the hinge plate connection, for shifting the body longitudinally on the frame.

2. Apparatus as defined in claim 1 in which the jack is double acting and is connected to the forward end of the frame.

3. Apparatus as defined in claim 1 in which rollers are provided on the truck frame on which the dump body rests when in carrying position, and other rollers are provided at the end of the truck frame disposed below the level of the first rollers on which the body is adapted to rest when turning through an angle of 90°.

4. In apparatus of the character described, a truck frame, a body shiftable longitudinally on the frame and adapted to turn through an angle of 90° about the end of the frame, hinge means connected to the dump body toward the rear of the frame and extending forwardly therefrom, a longitudinally slidable connection between the other end of the hinge means and the truck frame, said connection being disposed to restrain the body against lateral movement on the truck frame, and a horizontally disposed rearwardly directed double acting jack pivotally connected at its base to the forward end of the truck frame and at its other end to the body forwardly of the hinge means connection for shifting the body longitudinally of the frame.

5. In a dump truck including a frame with longitudinal guide members and with rollers mounted on the sides of the frame and a dump body mounted on the rollers for longitudinal movement, the combination of a hinge plate connected at one end to the dump body toward the rear of the frame, and extending forwardly from said connection, guide blocks cooperating with the guide members and connected to the forward end of the hinge plate, said guide blocks being disposed to slide longitudinally in the guide members means for limiting rearward movement of the guide blocks, and a horizontally disposed rearwardly directed double acting jack pivotally connected at its base to the truck frame and at its other end to the body forwardly of the hinge plate connection for shifting the body longitudinally of the frame.

6. A dump truck as defined in claim 5 in which rollers are provided at the rear in the end of the frame below the level of the other rollers over which the body moves to dump position.

7. A dump truck as defined in claim 5 in which the base of the jack is mounted midway the ends of a cross shaft journalled in the truck frame, and in which means are provided for restraining the jack against lateral movement.

8. A dump truck as defined in claim 5 in which the truck is provided with reversible power take off means, and means for starting and stopping said power take off means, together with a power transmission between the power take off means and the jack, and means actuated from the power take off means for engaging the starting and stopping means to stop the power take off means at predetermined limits of extension and retraction of the jack.

ROBERT A. FONTAINE.

REFERENCES CITED

The following references are of record in the file of this patent:

UNITED STATES PATENTS

| Number | Name | Date |
|---|---|---|
| 577,913 | Chrissinger | Mar. 2, 1897 |
| 878,751 | Schreiber | Feb. 11, 1908 |
| 1,050,998 | Pay | Jan. 21, 1913 |
| 1,600,615 | Anthony et al. | Sept. 21, 1926 |

FOREIGN PATENTS

| Number | Country | Date |
|---|---|---|
| 129,755 | Great Britain | July 24, 1919 |
| 145,154 | Great Britain | of 1920 |
| 235,608 | Great Britain | June 25, 1925 |
| 368,103 | Great Britain | Mar. 3, 1932 |
| 528,365 | France | Nov. 10, 1921 |